(12) United States Patent
Mascioni

(10) Patent No.: US 8,536,728 B2
(45) Date of Patent: Sep. 17, 2013

(54) MACHINE SUPPORT FOR RECEIVING A ROTOR/GENERATOR ASSEMBLY OF A GEARLESS WIND ENERGY PLANT

(75) Inventor: Andreas Mascioni, Puettlingen (DE)

(73) Assignee: Vensys Energy AG, Neunkirchen (DE)

( * ) Notice: Subject to any disclaimer, the term of this patent is extended or adjusted under 35 U.S.C. 154(b) by 143 days.

(21) Appl. No.: 13/138,285

(22) PCT Filed: Dec. 15, 2009

(86) PCT No.: PCT/DE2009/001757
§ 371 (c)(1),
(2), (4) Date: Jul. 27, 2011

(87) PCT Pub. No.: WO2010/091654
PCT Pub. Date: Aug. 19, 2010

(65) Prior Publication Data
US 2011/0285143 A1  Nov. 24, 2011

(30) Foreign Application Priority Data
Feb. 11, 2009 (DE) .......................... 10 2009 008 437

(51) Int. Cl.
*F03D 11/00* (2006.01)
(52) U.S. Cl.
USPC ........................................................ 290/55
(58) Field of Classification Search
USPC ........................................................ 290/55
See application file for complete search history.

(56) References Cited

U.S. PATENT DOCUMENTS

| 6,285,090 | B1* | 9/2001 | Brutsaert et al. ................. 290/55 |
| 7,205,678 | B2* | 4/2007 | Casazza et al. ................. 290/55 |
| 7,431,567 | B1* | 10/2008 | Bevington et al. ......... 416/244 R |
| 7,893,555 | B2* | 2/2011 | Casazza et al. ................. 290/55 |
| 8,334,608 | B2* | 12/2012 | Pechlivanoglou et al. ...... 290/44 |
| 8,410,623 | B2* | 4/2013 | Stockner ......................... 290/44 |
| 2006/0001269 | A1* | 1/2006 | Jansen et al. .................... 290/44 |
| 2008/0014088 | A1* | 1/2008 | Rogall ........................... 416/174 |
| 2010/0194114 | A1 | 8/2010 | Pechlivanoglou et al. |
| 2012/0228880 | A1* | 9/2012 | Aarhus ........................... 290/55 |

FOREIGN PATENT DOCUMENTS

| DE | 10 2005 042 394 | 3/2006 |
| DE | 10 2007 058 746 | 12/2008 |
| EP | 1291521 A1 * | 3/2003 |
| EP | 1 319 830 | 6/2003 |
| EP | 1 394 406 | 3/2004 |
| WO | WO-2007/008884 | 1/2007 |

\* cited by examiner

Primary Examiner — Joseph Waks
(74) Attorney, Agent, or Firm — Jordan and Hamburg LL

(57) ABSTRACT

Disclosed is a mainframe for receiving a rotor-generator assembly of a gearless wind turbine, wherein the mainframe connects the rotor-generator assembly to the tower of the wind turbine; is rotatably mounted on the tower; and comprises pipe sections arranged at an angle to each other, one of which can be connected to the rotor-generator assembly and the other of which can be connected to the tower. The pipe section that can be connected to the rotor-generator assembly is connected to the lateral surface of the other pipe section by way of an end edge surface facing away from the rotor-generator assembly, and the lateral surface of the other pipe section extends into the region surrounded by the connection.

12 Claims, 3 Drawing Sheets

MACHINE SUPPORT FOR RECEIVING A ROTOR/GENERATOR ASSEMBLY OF A GEARLESS WIND ENERGY PLANT

BACKGROUND OF THE INVENTION

The invention relates to a mainframe for receiving a rotor-generator assembly of a gearless wind turbine, wherein the mainframe: connects the rotor-generator assembly to the tower of the wind turbine; is rotatably mounted on the tower; and comprises pipe sections which are connected to each other and disposed at an angle to each other, one of which can be connected to the rotor-generator assembly and the other can be connected to the tower.

A mainframe is customarily known in which the pipe sections are connected to each other by way of end edge surfaces facing away from the rotor-generator assembly or away from the tower. This mainframe is subject to high static loads, and more notably to high dynamic loads. These may result in deformations of the pipe cross-sections, and particularly ovalization of the pipe section that can be connected to the rotor-generator assembly. The disadvantage is that such deformations must be counterbalanced by accordingly high usage of materials.

SUMMARY OF THE INVENTION

The object of the invention is to create a new mainframe of the aforementioned type, which meets the strength requirements for gearless wind turbines and has the lowest possible material usage.

The mainframe according to the invention, which achieves this object, is characterized in that the pipe section that can be connected to the rotor-generator assembly is connected to the lateral surface of the other pipe section by way of an end edge surface facing away from the rotor-generator assembly, and in that the lateral surface of the other pipe section extends into a region surrounded by the connection.

The connection according to the invention between the pipe sections results in considerably improved mainframe stability. In particular, the pipe wall region of the other pipe section that can be connected to the tower, this pipe wall region being surrounded by the connection, reinforces the pipe section that can be connected to the rotor-generator assembly and prevents ovalization of the cross-section thereof.

Particularly high stability is achieved if, according to a preferred embodiment of the invention, the end edge surface of the pipe section that can be connected to the rotor-generator assembly is circumferentially connected to the aforementioned lateral surface.

In the preferred embodiment, the other pipe section that can be connected to the tower has the shape of an upwardly tapering cone. This conical shape makes it possible for the mainframe to absorb particularly high tilting moments that are perpendicular to the rotational axis of the rotor.

The lateral surface or pipe wall of the other pipe section can be entirely continuous in the region surrounded by the connection, or it can be continuous except for an opening. Such an opening advantageously provides access to the rotor-generator assembly.

The opening is advantageously encircled by a reinforcement frame so as to compensate for the decrease in strength associated with the opening in the surrounded lateral surface region, or pipe wall region.

In a further embodiment of the invention, the other pipe section that can be connected to the tower can comprise a ceiling wall on the upper face, wherein this ceiling wall preferably extends obliquely to the vertical, for example at an angle of 45°, so as to save material. This ceiling wall considerably stabilizes the pipe section that can be connected to the tower. An opening can be configured in the ceiling wall, so as to allow access to additional devices accommodated in the tower head through the mainframe.

At the upper edge, the ceiling wall can adjoin the connection to the pipe section that can be connected to the rotor-generator assembly.

The mainframe is preferably integrally cast. However, a welded construction that is composed of a plurality of parts would also be possible.

The invention will be described in more detail hereafter based on an exemplary embodiment and the accompanying drawings referencing, amongst others, this exemplary embodiment.

DESCRIPTION OF THE PREFERRED EMBODIMENTS

Figure 5:
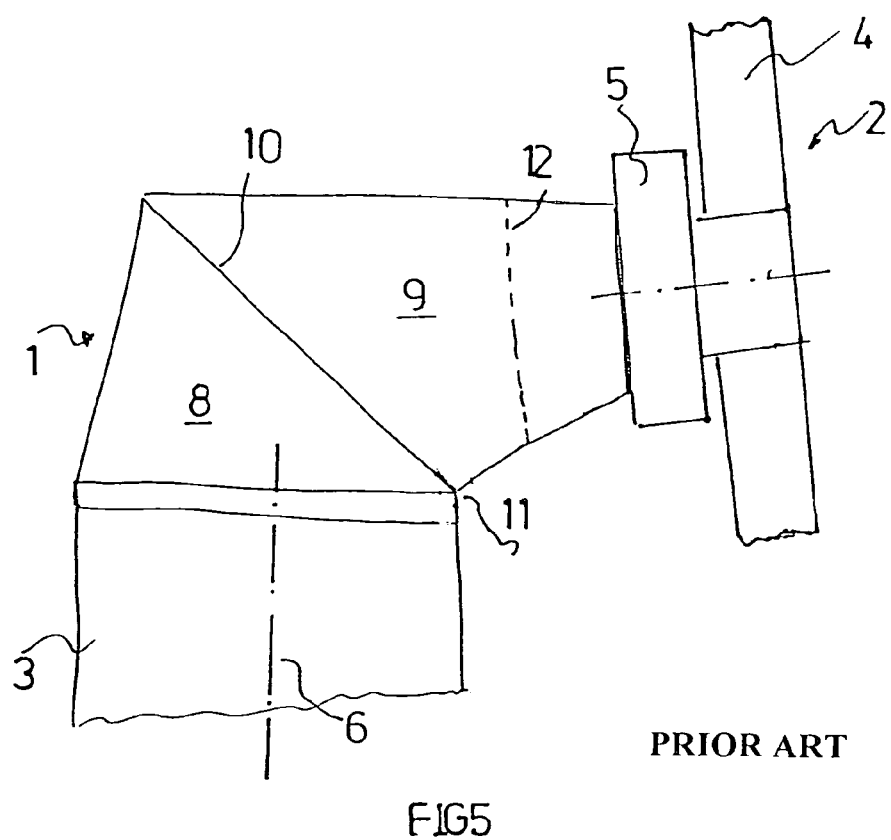
FIG. 5 is a mainframe according to the prior art.

First, reference is made to FIG. 5, which shows a conventional mainframe 1. The mainframe 1 connects the rotor-generator assembly 2 to a tower 3 of a wind turbine. A rotor 4 of the rotor-generator assembly 2 is in direct driving engagement with a generator 5 without the use of a gearbox. The rotor-generator assembly 2 is connected to the mainframe 1 via the generator 5. The mainframe 1 can be rotated about an axis 6 on the tower 3.

The mainframe 1 comprises two conical pipe sections 8 and 9. By means of mutually facing end edge surfaces, the pipe sections 8 and 9 are connected to each other at 10, forming a continuous pipe interior.

The mainframe 1 is notably subject to dynamic forces transmitted by the rotor 4, which results in a particularly critical load at 11. Ovalization of the pipe section 9 caused by such loads can be somewhat, but insufficiently, counteracted by a punctiformly supported reinforcement disk, which is indicated at 12.

A mainframe 1 of a wind turbine shown in FIGS. 1 to 4 is designed as an integral casting and comprises a conical pipe section 8 and an approximately cylindrical pipe section 9. At 10, the pipe section 9 is circumferentially connected to the outer lateral surface of the pipe section 8 by way of an end edge surface formed by the pipe wall cross-section. Because of the connection 10, no continuous pipe interior is formed, as in the mainframe in FIG. 5, but rather the lateral surface or pipe wall of the pipe section 8 extends continuously, except for an opening 13, over the region surrounded by the circumferential connection 10.

At the free ends, each pipe section 8, 9 comprises a connecting flange 14 or 15, the connecting flange 14 being used for the connection to the generator of a rotor-generator assembly and the connecting flange 15 being used for connecting the wind turbine to the tower.

Figure 1:
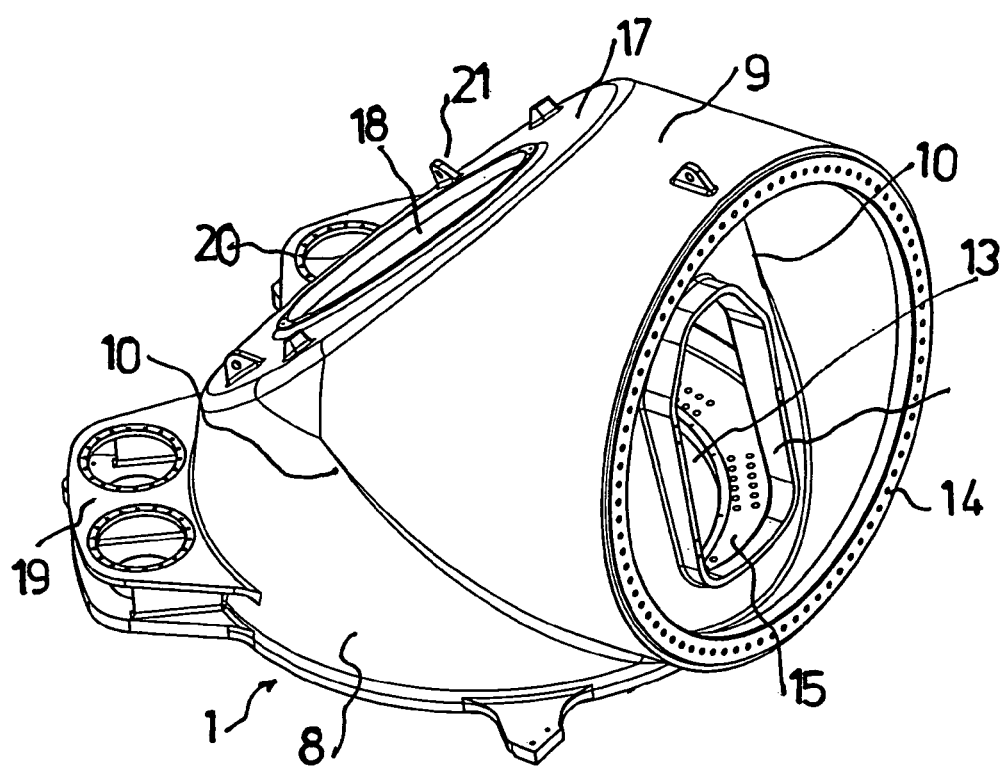
FIG. 1 is a oblique front perspective view of a mainframe according to the invention.
Figure 2:
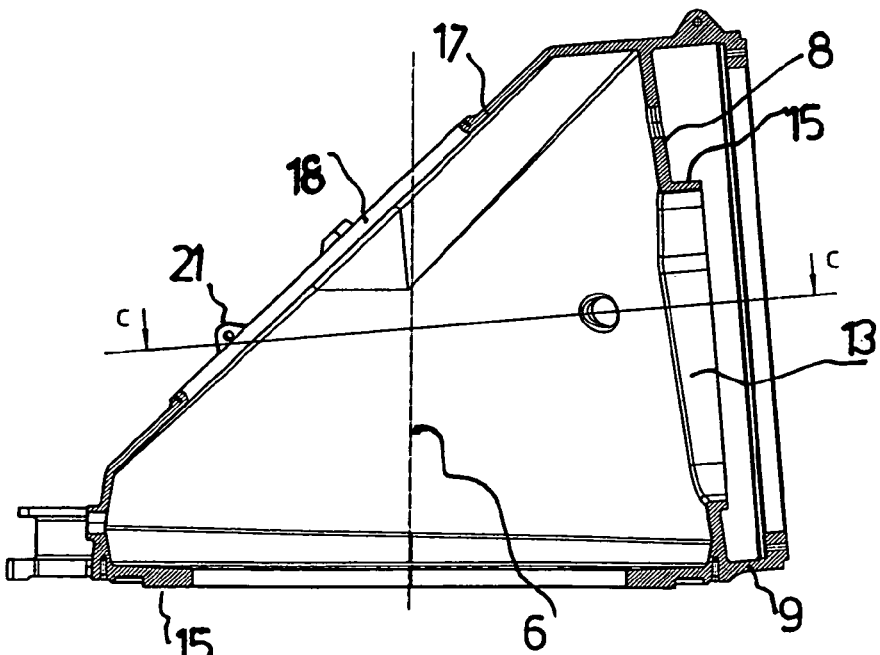
FIG. 2 is a cutaway side view of the mainframe of FIG. 1.
Figure 3:
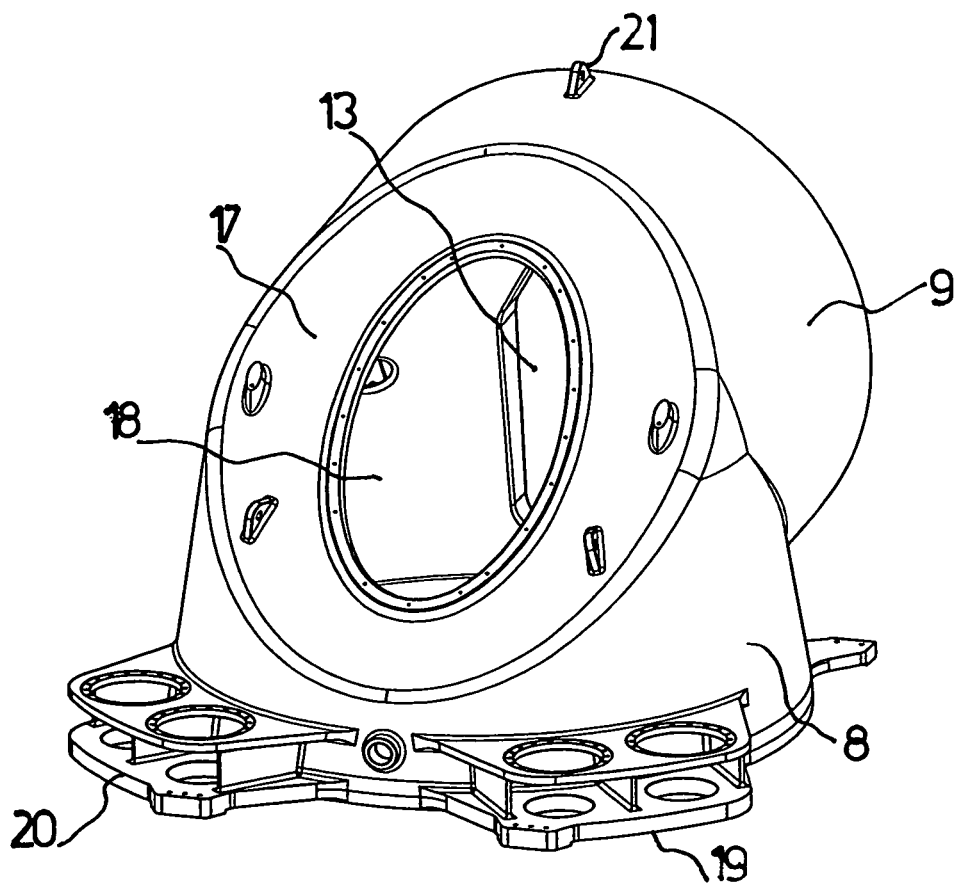
FIG. 3 is a oblique rear perspective view of the mainframe of FIG. 1.
Figure 4:
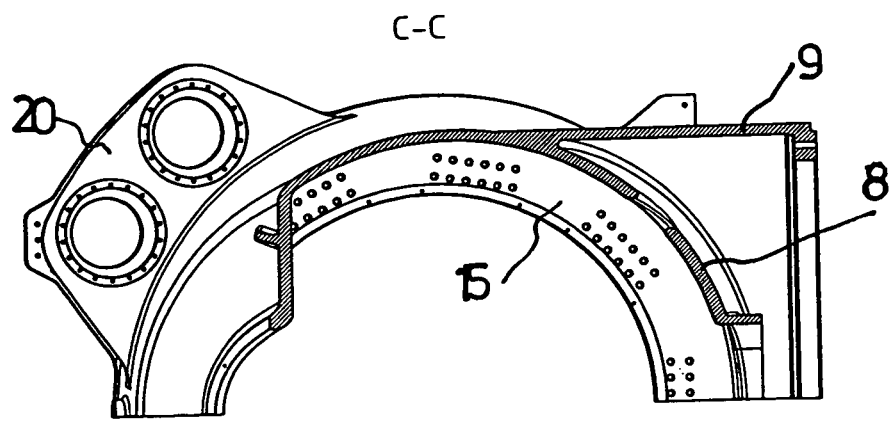
FIG. 4 is a sectional view of the mainframe of FIG. 1 along the intersecting line C-C in FIG. 2.

As is apparent in particular from FIGS. 1 and 2, the opening 13 is encircled by a circumferential frame reinforcement 16.

At the top, the pipe section 8 is closed by a ceiling wall 17 having an opening 18. The ceiling wall 17 of the mainframe, which is inclined relative to the rotational axis, has an angle of approximately 45° relative to the rotational axis.

Retainers 19 and 20, which protrude radially from the pipe section 8 at the lower edge, are used to receive a total of four motor-gearbox units (not shown) provided for rotationally driving the mainframe 1.

A plurality of eyelets 21 are provided on the outside of the mainframe 1 for attaching installation mountings.

Unlike the mainframe in FIG. 5, the mainframe 1 shown in FIGS. 1 to 4 can transmit the dynamic loads transmitted by the rotor-generator assembly to the tower without noticeable deformation. This improved load transfer can be attributed to the pipe section 9 being circumferentially connected to the lateral surface of the pipe section 8, at the end edge thereof that faces away from the flange 14, with the lateral surface or pipe wall being continuous in the region enclosed by the connection 10, except for the opening 13. This notably counteracts ovalization of the pipe section 9. The pipe section 9 is short, and on the bottom face extends close to the conical pipe section 8. This also contributes to reducing deformation of the mainframe 1 under load. The mainframe 3 can thus, in the overall, be produced in a material-saving manner.

The invention claimed is:

1. A mainframe for receiving a rotor-generator assembly of a gearless wind turbine, wherein a mainframe connects the rotor-generator assembly to a tower of the wind turbine; is rotatably mounted on the tower; and comprises pipe sections which are connected to each other and arranged at an angle to each other, one of which can be connected to the rotor-generator assembly and the other of which can be connected to the tower, the pipe section that can be connected to the rotor-generator assembly is connected to a lateral surface of the other pipe section by way of an end edge surface facing away from the rotor-generator assembly, and the lateral surface of the other pipe section extends into a region surrounded by a connection.

2. A mainframe according to claim 1, wherein the pipe section that can be connected to the rotor-generator assembly is circumferentially connected to the lateral surface of the other pipe section.

3. A mainframe according to claim 1, wherein the other pipe section is conically tapered toward the top.

4. A mainframe according to claim 1, wherein the lateral surface is continuous, except for an opening, in the region surrounded by the connection.

5. A mainframe according to claim 4, wherein the opening is encircled by a reinforcement frame.

6. A mainframe according to claim 1, wherein the other pipe section comprises a ceiling wall on an upper face.

7. A mainframe according to claim 6, wherein the ceiling wall is positioned obliquely to the vertical.

8. A mainframe according to claim 6 wherein at an upper edge, the ceiling wall adjoins the connection to the pipe section that can be connected to the rotor-generator assembly.

9. A mainframe according to claim 6, wherein the ceiling wall comprises an opening.

10. A mainframe according to claim 6, wherein the ceiling wall is positioned at an angle of 45 degrees relative to vertical.

11. A mainframe according to claim 1, wherein the mainframe is integrally cast or produced as a welded construction.

12. A mainframe according to claim 1, wherein the lateral surface is continuous.

* * * * *